US005237254A

United States Patent [19]

Guerin

[11] Patent Number: 5,237,254

[45] Date of Patent: Aug. 17, 1993

[54] CONTROL CIRCUIT FOR A STEPPING MOTOR

[75] Inventor: Yves Guerin, Grenchen, Switzerland

[73] Assignee: ETA SA Fabriques d'Ebauches, Grenchen, Switzerland

[21] Appl. No.: 585,797

[22] Filed: Sep. 20, 1990

Related U.S. Application Data

[63] Continuation-in-part of Ser. No. 308,505, Feb. 10, 1989.

[30] Foreign Application Priority Data

Feb. 12, 1988 [CH] Switzerland ....................... 00513/88

[51] Int. Cl.[5] .............................................. G05B 19/40

[52] U.S. Cl. ....................................... 318/685; 363/98

[58] Field of Search ................ 318/685, 696; 323/266, 323/282, 286, 288; 363/86, 47, 96–98; 307/96; 368/157, 203, 204

[56] References Cited

U.S. PATENT DOCUMENTS

| | | | |
|---|---|---|---|
| 3,323,034 | 5/1967 | Dubin et al. | 363/86 |
| 3,364,413 | 1/1968 | Abraham | 363/96 |
| 4,439,717 | 3/1984 | Berney | 318/696 |
| 4,516,064 | 5/1985 | Oudet et al. | 318/696 |
| 4,567,425 | 1/1986 | Bloomer . | |

OTHER PUBLICATIONS

"Digital Fundamentals" Thomas L. Floyd, pp. 250–251, Charles E. Merrill Publishing Company 1982.

*Primary Examiner*—William M. Shoop, Jr.
*Attorney, Agent, or Firm*—Pollock, Vande Sande & Priddy

[57] ABSTRACT

The control device is intended to supply a stepping motor with driving pulses during which the mean value of the voltage applied to the coil of this motor is independent from the voltage of the power supply source of the device.

For that purpose, the control device comprises a driving circuit which connects or disconnects the coil of the motor to or from the power supply source when a control signal has a first state or a second state respectively, and a control circuit which produces this control signal with its first state or its second state in dependency on the difference between a reference voltage and the voltage across the coil.

2 Claims, 5 Drawing Sheets

CONTROL CIRCUIT FOR A STEPPING MOTOR

This application is a continuation-in-part application based on U.S. Ser. No. 07/308,505, filed Feb. 10, 1989.

FIELD OF THE INVENTION

The present invention relates to a control circuit for a stepping motor, for example for a wristwatch, the motor comprising a rotor having a permanent magnet and a coil magnetically connected to this magnet. It relates more particularly to a circuit supplying the coil from a power supply with drive pulses the mean voltage of which is independent of variations in the supply voltage.

BACKGROUND OF THE INVENTION

Circuits of this type are well known since they have many advantages, particularly in small timepieces. In this case the supply voltage is provided by a battery. Depending on the type of battery, its nominal voltage may vary considerably. Thus, a mercury battery has a voltage of 1.35 V, whereas silver and lithium batteries provide 1.5 V and 3 V respectively. With a conventional control circuit which supplies drive pulses of an amplitude equal to that of the power supply it is, of course, impossible to replace one type of battery by another without upsetting the operation of the motor. This is a major disadvantage, because each type of battery has to correspond to a specific circuit, and because this causes after-sale service problems.

By contrast, this does not raise any difficulties with a control circuit supplying drive pulses the mean voltage of which is independent of variations in the input voltage of the power supply, it being possible for these variations to result either from the replacement of the battery by another one of a different type or from the state of discharge of a given battery. The mean voltage of the drive pulse may, moreover, in the case of a circuit of this type, be set at a value considerably lower than that of the voltage of the battery. This is a substantial advantage since the coil of the motors intended to be driven by such a circuit may then be made of a wire of large cross section, i.e. a wire that is cheap and easy to work, making it possible to reduce the price of the motor.

DESCRIPTION OF THE PRIOR ART

To obtain drive pulses having a constant mean voltage without dissipating energy across a voltage drop resistor, interruption in the drive pulse current has been made to render it intermittent, the duration and number of the interruptions depending on the supply voltage.

British patent A-2 054 916 for example describes a control circuit having means for detecting the output voltage of a power supply and comparing it with a reference voltage, and five pre-set programs for interrupting the drive pulse current. The permissible variation in the voltage of the power supply is divided into five ranges and one of these programs corresponds to each range, the programs being set up in such a way that the mean voltage is equal to the value required in the centre of each range. Adjustment is thus discontinuous and consequently the mean voltage does not remain constant within a given range. As a result, at the lower limit of the range the motor could omit steps, its torque being reduced, whereas at the upper limit its output would not be optimum.

A more sophisticated control circuit having the advantage that it regulates the mean voltage in continuous manner is described in European patent application EP 0 154 889. This has a sweep oscillator setting up interruptions in the drive pulse, the duration of these interruptions being governed by variations of the power supply output voltage so as to keep the mean voltage of the drive pulse constant. Provided the oscillator produces the appropriate interruptions, this circuit makes it possible to achieve precise regulation.

The two circuits which have just been described thus have regulator means which, by setting up interruptions in the current passing through the coil during the drive pulse, make it possible to keep the mean voltage applied to the terminals of the coil constant regardless of the voltage of the input voltage. This is an open loop regulator in which the output signal, in this case the mean voltage, is directly governed by the input signal, that is the output voltage from the power supply. It is well known that this type of regulation can only give good results provided the values of the circuit elements correspond exactly to the specifications, it being possible for differences, albeit small, in certain critical elements to lead to large differences in the output signal. This is, of course, a major disadvantage. On the one hand, a circuit of this type, if it is to conform to specific characteristics, needs rigorous quality control during manufacture which increases its cost price. On the other hand, these characteristics cannot be guaranteed in the long term since the circuit elements may change as they get older.

OBJECTS OF THE INVENTION

It is a primary object of the invention to provide a control circuit which delivers drive pulses having a constant mean voltage to a stepping motor and which avoids the disadvantages set out above.

BRIEF SUMMARY OF THE INVENTION

To achieve this object, the control circuit of the invention, adapted to supply output pulses to the coil of a stepping motor, has the following features:

a power supply source;

a pulse shaping circuit providing a control pulse each time said rotor has to turn by one step;

driving means responsive to said control pulse and to a control signal for connecting said coil to said power supply source when said control signal has a first state and for disconnecting said coil from said power supply, source when said control signal has a second state;

a reference voltage source; and control means connected to said reference source and to said coil for producing said control signal with said first state in response to the voltage across said coil being lower than said reference voltage and with said second state in response to said voltage across said coil being higher than said reference voltage.

An advantage of the control circuit of the invention is that it is based on the closed loop regulation principle, the interruptions in the drive pulse being determined by the voltage at the terminals of the coil and not, as in the prior art, by the supply voltage. In other words, this circuit effects the automatic control of an output signal, i.e. the mean voltage at the terminals of the coil in such a way that it equals a reference signal. It is well known that with this type of regulation the output signal is very little influenced both by outside disturbances such as variations in the power supply or in temperature for exemple, or by variations in the values of the circuit elements. As a result, the circuit of the invention is both easier to manufacture and less sensitive to sundry disturbances than prior art circuits.

BRIEF DESCRIPTION OF THE DRAWINGS

Other features and advantages of the invention will now be seen from the following description which will be made with reference to the accompanying drawings which represent, as not limiting examples, some embodiments of a control circuit according to the invention.

In these drawings, where the same reference numerals relate to similar elements.

DESCRIPTION OF THE PREFERRED EMBODIMENT

Figure 1:
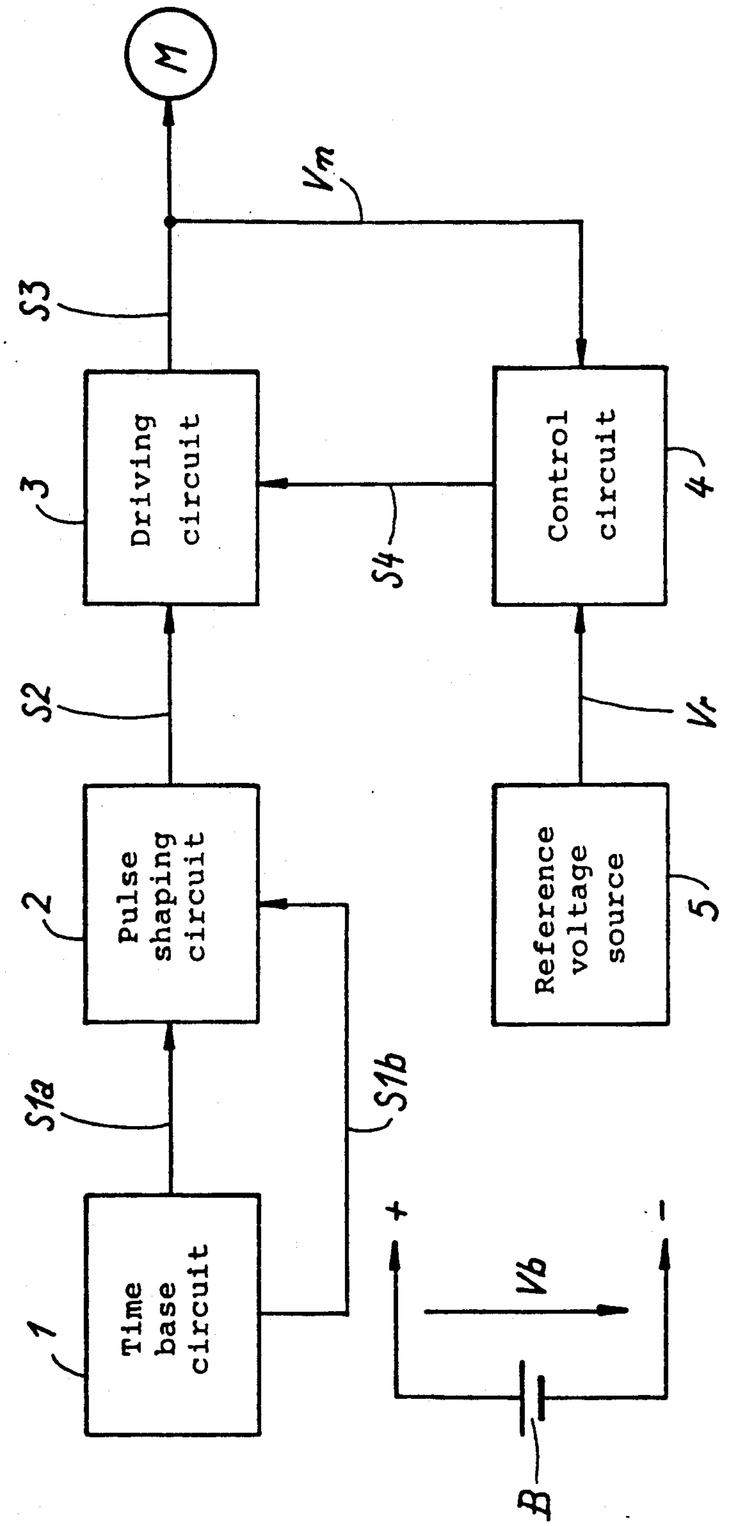
FIG. 1 is a block diagram of a control device for a stepping motor according to the invention.

The device schematically represented in FIG. 1 is, by way of non limiting example, a wristwatch having a stepping motor M driving time displaying hands which have not been shown.

This device comprises a power supply source B, for example a small battery, supplying all the elements which will be described hereafter with a voltage Vb by way of connections which have not been shown.

For a reason which will be made clear later in this description, the motor M is so designed that it functions correctly in response to driving pulses during which the voltage applied to the coil of this motor M is lower than Vb.

The device of FIG. 1 further comprises a time base circuit 1 including in a well known manner a quartz oscillator and a frequency divider which have not been separately shown.

Time base circuit 1 provides in a well known manner a first periodic signal S1*a* having a first frequency and a second periodic signal S1*b* having a second frequency higher than the one of signal S1*a*.

Signal S1*a* and S1*b* are applied to a pulse shaping circuit which responds thereto in providing a signal S2 comprised of pulses P2 having the same frequency as signal S1*a* and a duration equal to the half of the period of signal S1*b*.

For a reason which will be made clear later in this description, the frequency of signal S1*a* and, thus, of signal S2, is equal to the frequency of the driving pulses which are to be applied to motor M, for example 1 Hz, and the frequency of signal S1*b* is such that the half of its period, and thus the duration of pulses P2, is equal to the duration of these driving pulses, for example about 7.8 milliseconds.

The device of FIG. 1 further comprises a driving circuit 3, examples of which will be described later. The driving circuit 3 is arranged to respond to the above mentioned signal S2, for applying to the stepping motor M a driving signal S3 comprising driving pulses P3 having the same duration as the pulses P2 and an alternating polarity.

Figure 2:
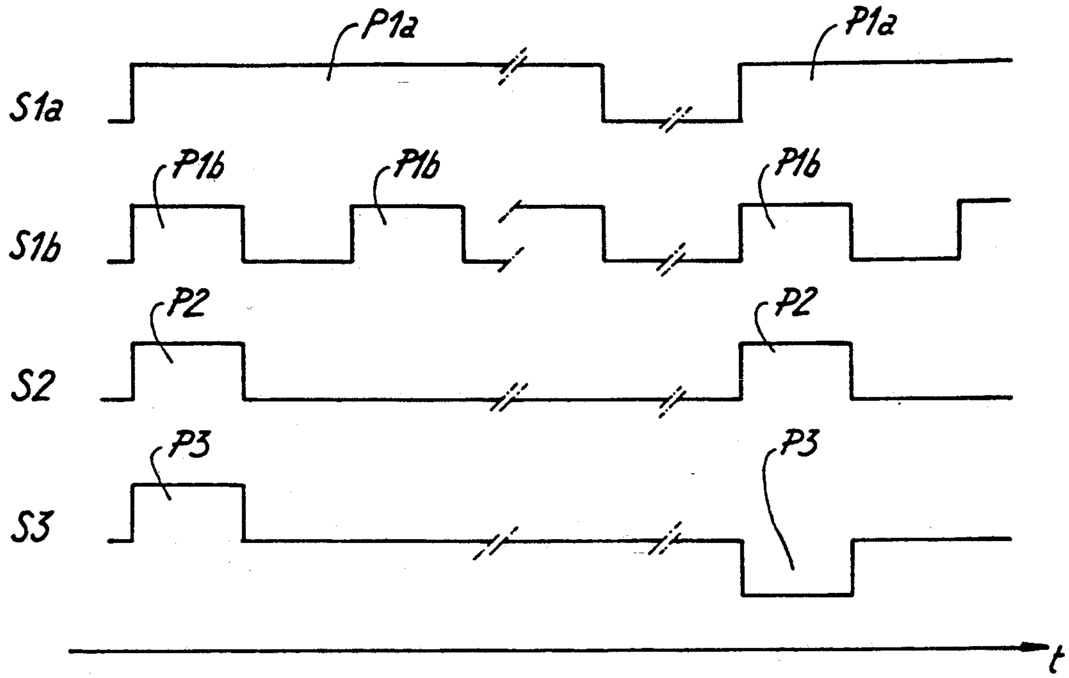
FIG. 2 represents some signals measured in the device of FIG. 1.
Figure 3:
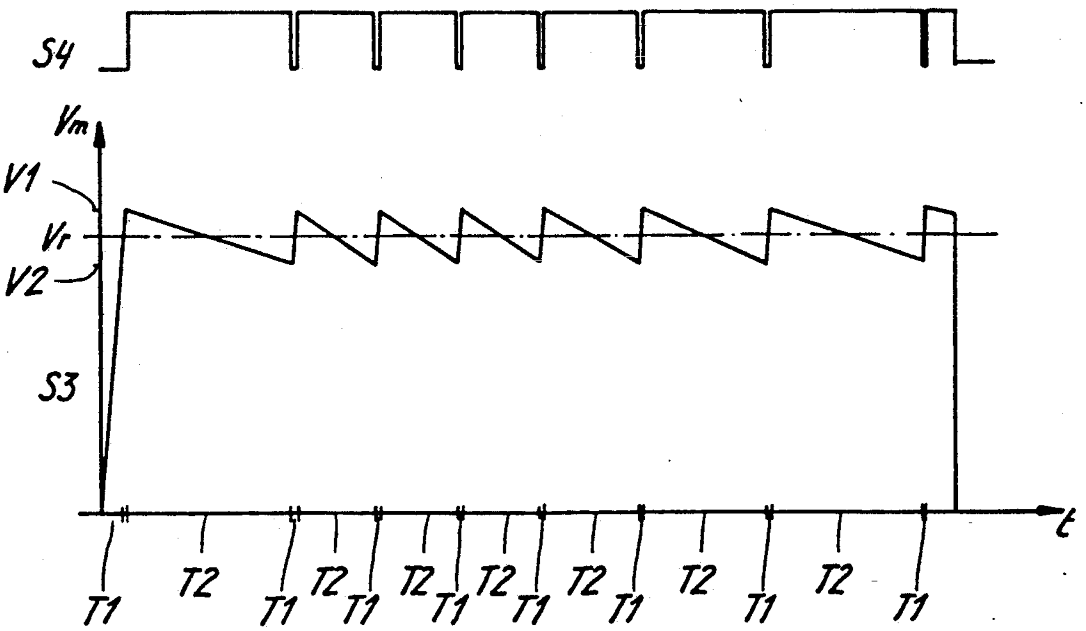
FIG. 3 represents another signal and the voltage applied to the coil of the stepping motor during a driving pulse in a first embodiment of the device of FIG. 1.
Figure 5:
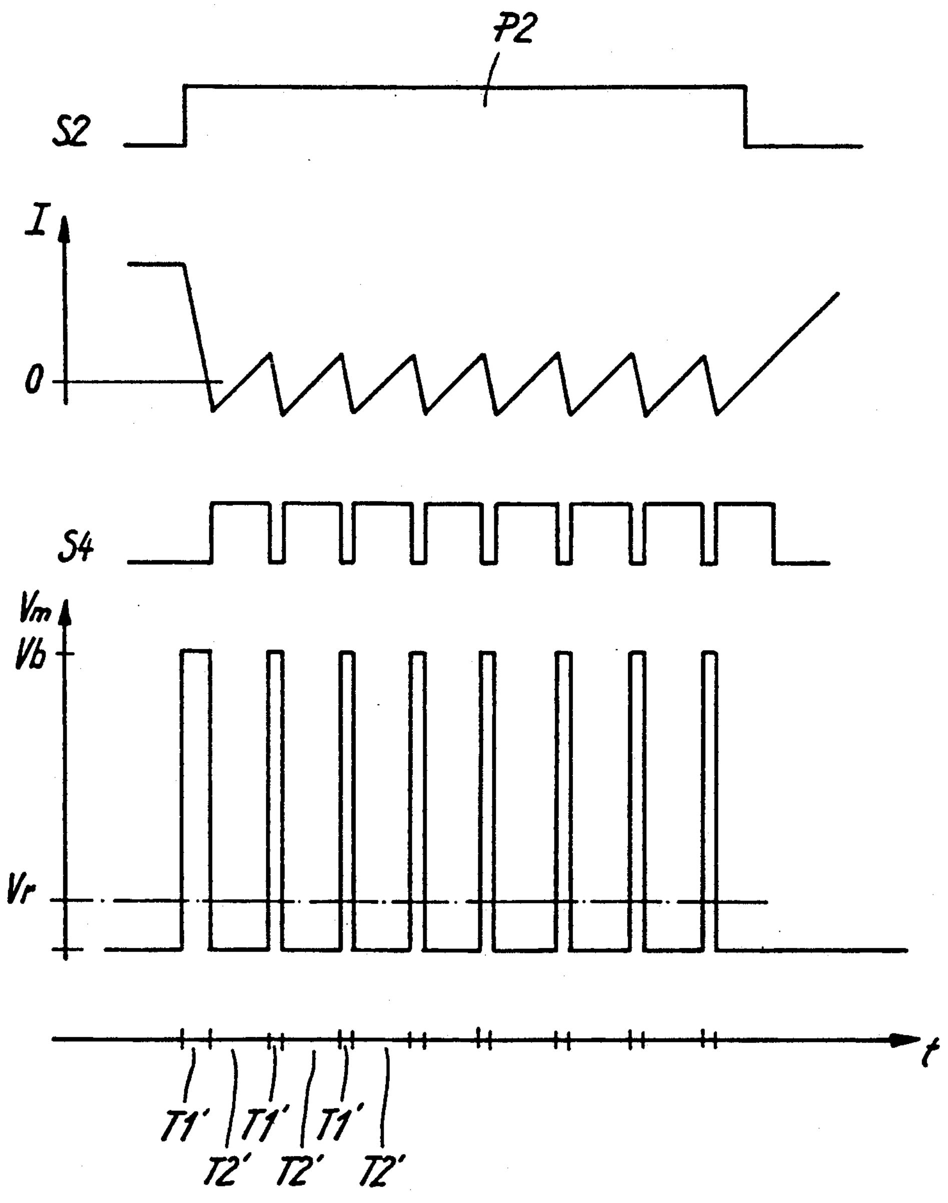
FIG. 5 represents some signals measured in a second embodiment of the device of FIG. 1.

Signals S1*a*, S1*b*, S2 and S3 are shown in FIG. 2. It should nevertheless be noted that pulses P3 are only schematically drawn in that FIG. 2, and that more detailed representations of these pulses P3 are shown in FIGS. 3 and 5.

Driving circuit 3 is further so designed that the coil of motor M is short-circuited between the driving pulses P3 and, during each of these driving pulses is P3, connected in series with the power supply source B when a control signal S4 suppplied by a control circuit is in a first state, for example the logic level low, and is disconnected from that source B when that control signal S4 is in a second state, the logic level high in the same example.

In a first embodiment of the device of FIG. 1, the control circuit 4 is so designed that control signal S4 is in its first state when the voltage Vm at the terminals of the coil of motor M is lower than the same reference voltage Vr supplied by a source 5, that is when the difference Vr−Vm is positive, and in its second state when the voltage Vm is higher than this voltage Vr, that is when the difference Vr−Vm is negative. In this embodiment, the control circuit 4 may thus merely be made of a voltage comparator circuit the inputs of which receive the voltage Vm and the voltage Vr respectively.

In the same embodiment, the driving 3 circuit is so designed that, when the coil of motor M is disconnected from the power supply source B in response to the second state of the control signal S4, this coil is not short-circuited, but is connected to a temporary power source in such a way that the voltage Vm decreases relatively slowly.

For a reason which will also be made clear later in this description, the reference voltage source 5 is so designed that Vr is equal to the voltage of the driving pulses the motor M has to receive for correctly functioning.

In this first embodiment, the device of FIG. 1 functions as follows:

As already stated, the coil of motor M is short-circuited between the driving pulses P3. The voltage Vm is thus substantially zero, that is lower than voltage Vr, and signal S4 is in its first state.

So, when the pulse shaping circuit 2 begins to apply a pulse P2 to the driving circuit 3, the latter immediately connects the coil of motor M to the power supply source B.

The voltage Vm thus rises very quickly towards voltage Vb but when it becomes higher than voltage Vr, signal S4 switches to its second state and driving circuit 3 responds to this second state of signal S4 in disconnecting the coil of motor M from the power supply B.

As already stated, the voltage Vm then relatively slowly decreases. When it becomes lower than voltage Vr, signal S4 switches again to its first state, so that driving circuit 3 connects again the coil of motor M to the source B. Voltage Vm thus rises again towards voltage Vb, and the above described process repeats until the end of pulse P2.

Thus, each driving pulse P3 comprises a plurality of relatively short periods T1 during which the coil of motor M is connected to the power source B and the voltage Vm increases up to a first value V1, higher than Vr, and a plurality of second periods T2, longer than the periods T1, during which the coil of motor M is disconnected from the source B and the voltage Vm decreases down to a second value V2 lower than Vr. The difference between Vr and V1 and V2 respectively is small and is due to the hysteresis that the comparator circuit which forms the control circuit 4 presents like any other such comparator circuit.

The duration of periods T1 and T2 is not constant, for it depends, among other things, on the speed of the rotor of motor M during the driving pulse P3, which speed is not constant.

It is easy to see that despite the variation of periods T1 and T2, the mean value of voltage Vm during each driving pulse P3 is equal to Vr and thus, equal to the voltage the motor M has to receive during these driving pulses P3 to correctly function.

FIG. 3 shows with more details a driving pulse P3 and the corresponding signal S4. It should be noted that the variation of Vm are normally not linear as represented in this FIG. 3 for the sake of simplicity, but rather exponential. Moreover, these variations are actually faster than represented in this FIG. 3, so that the number of commutations occuring during a driving pulse P3 is higher than also represented in this FIG. 3.

Figure 4:
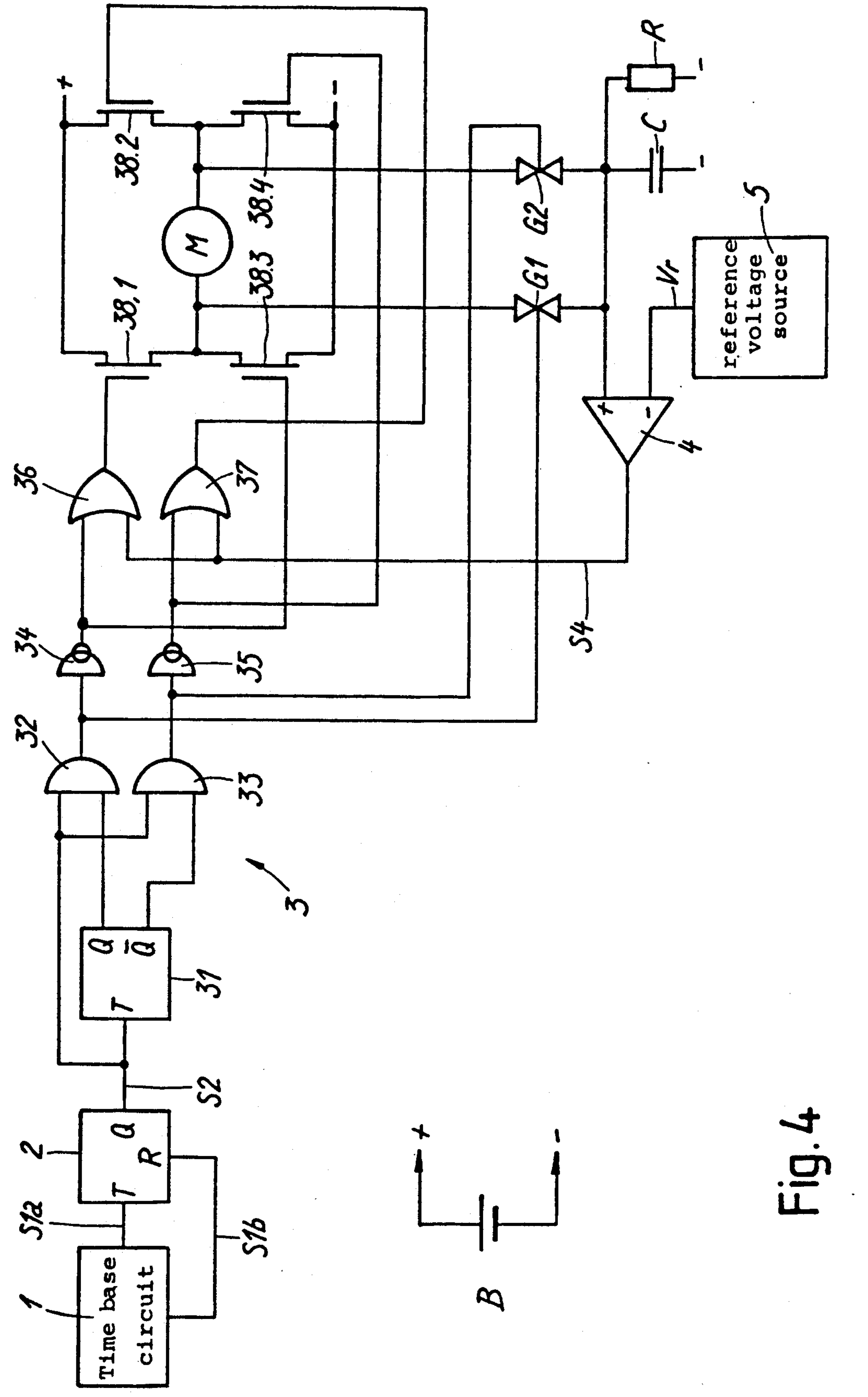
FIG. 4 represents a more detailed schematic of the first embodiment of the device of FIG. 1.

FIG. 4 shows a more detailed example of the first embodiment of the device of FIG. 1 which has just been described, the elements which are identical in FIGS. 1 and 4 being identically referenced.

In this example, the pulse shaping circuit 2 is constituted by a toggle flip-flop which receives on its clock input T and its reset input R respectively the signals S1*a* and S1*b* produced by the time base circuit 1.

The output Q of that flip-flop 2, which produces the signal S2, is connected to the driving circuit 3 which comprises in this example a second toggle flip-flop 31, two AND-gates 32 and 33, two inverters 34 and 35, two OR-gates 36 and 37, a well-known bridge connected to the motor M and made of two p-MOS transistors 38.1 and 38.2 and of two n-MOS transistors 38.3 and 38.4, two transmission gates G1 and G2 and a capacitor C in parallel with a resistor R.

Still in this example, the comparator circuit of the control circuit 4 is constituted by a differential amplifier the non-inverting input of which is connected to the terminals of the coil of motor M through the gates G1 and G2 and to the capacitor C, and the inverting input of which is connected to the reference voltage source 5.

It is easy to see that when signal S2 is at its logic level low, that is between the driving pulses P3, both gates G1 and G2 and both transistors 38.1 and 38.2 are blocked, and both transistor 38.3 and 38.4 are conducting. The coil of motor M is thus short-circuited, and the voltage Vm is substantially zero.

Further, signal S4 is at logic level low, for capacitor C has been discharged through resistor R, and the voltage at the non-inverting input of amplifier 4 is thus lower than reference voltage Vr.

When signal S2 switches to its high level, flip-flop 31 toggles and takes, for example, the state where its output Q is at the logic level high.

This high level causes transistor 38.1 to conduct and transistor 38.3 to block. Thus, the coil of motor M is connected to the power source B, and the voltage Vm increases very quickly towards Vb.

At the same time, the high level of output Q of flip-flop 31 causes the gate G1 to become conductive. The voltage Vm is thus applied to the non-inverting input of amplifier 4 and to the capacitor C. The loading of the latter capacitor C slightly delays the increase of the voltage Vm.

When this voltage Vm reaches the above mentioned value V1, slightly above Vr, signal S4 switches to its high level, which causes transistor 38.1 to switch off, transistor 38.3 and gate G1 remaining conducting.

The coil of motor M is thus disconnected from the power supply source, but is now supplied by the capacitor C. The latter discharges through this coil causing voltage Vm to decrease relatively slowly.

When voltage Vm reaches the above-mentioned value V2, slightly under Vr, signal S4 switches again to the logic low level, causing thus transistor 38.1 to switch on again, the coil of motor M being thus connected again to the power supply source B.

It is easy to see that this process repeats until the end of pulse P2, where signal S2 switches again to logic level low, which causes transistor 38.1 and gate G1 to switch off, and transistor 38.3 to switch on. The driving pulse P3 which was applied to the coil of motor M is thus interrupted, and the circuits of FIG. 4 remain in the state they were in before the beginning of former pulse P2, with the only exception of flip-flop 31 and of capacitor C which, at the instant of the interruption of the driving pulse P3, is loaded to a voltage near voltage Vr. This capacitor C unloads through resistor R the value of which is so chosen that the voltage at the non-inverting input of amplifier 4 certainly decreases to a value lower than Vr before the beginning of next driving pulse P3.

At the very beginning of next pulse P2, flip-flop 31 switches to the state where its $\overline{Q}$ output is in the logic high level.

This high level causes transistor 38.2 and gate G2 to switch on, and transistor 38.4 to switch off.

As above, the coil of motor M is thus connected to the power supply source B but the polarity of the driving pulse P3 which begins at that instant is inverted with respect to the polarity of the former one.

Nevertheless, the voltage Vm is applied to the non-inverting input of amplifier 4 with the same polarity as during the former driving pulse P3, due to the fact that it is now gate G2 which is on.

The functioning of the circuit of FIG. 4 during the present driving pulse P3 will not be described in detail, for it is very similar to what has been described above. It should only be noted that, during this driving pulse, it is the transistor 38.2 which alternatively switches on and off in response to signal S4 to respectively connect and disconnect the coil of motor M to and from the power supply source B.

In another embodiment of the device of FIG. 1, the control circuit 4 is so designed that control signal S4 has its first state when the function $$I = \int_0^t (Vr - Vm)dt$$

is positive and has its second state when this function I is negative, Vm and Vr being as above the voltage at the terminals of the coil of the motor M and the reference voltage supplied by source 5 respectively.

In this other embodiment, the driving circuit 3 is further so designed that, when the coil of motor M is disconnected from the power supply source B in response to the second state of the control signal S4, this coil is short-circuited, so that voltage Vm becomes immediately substantially zero. It is well known that, in such a situation the rotor of the motor M continues to turn due to its inertia and to the current which continues to flow through the coil of this motor M.

The functioning of this other embodiment of the device of FIG. 1 is the following:

As already stated, the coil of motor M is short-circuited between the driving pulses P3. The voltage Vm is thus substantially zero, and the above-defined function I is positive. Signal S4 has therefore its first state, so that the coil of motor M is immediately connected to the power supply source B when the pulse shaping circuit 2 begins to apply a pulse P2 to the driving circuit 3.

From that instant, the voltage Vm is equal to Vb and thus greater than Vr, so that the above defined function I begins to decrease.

When that function I becomes negative, signal S4 switches to its second state, causing the coil of motor M to be disconnected from the power supply source B and to be short-circuited by the driving circuit 3.

The voltage Vm becomes substantially zero again and thus lower than Vr, so that the function I begins to increase.

As soon as that function I becomes positive, signal S4 switches again to its first state with the same consequence as described above.

It is easy to see that this process repeats until the end of pulse P2.

In this embodiment of the device of FIG. 1, each driving pulse P3 comprises thus a plurality of periods T1′ during which the coil of motor M is connected to the power source B and the voltage Vm is equal to Vb, and a plurality of periods T2′ during which this coil is disconnected from power supply source B and short-circuited, the voltage Vm being thus substantially zero during these latter periods T2′.

Further, the durations of periods T1′ and T2′ depend only on the difference between Vr and Vm, for a given control circuit 4. Thus, as Vm equals Vb during each period T1′, the duration of the latter is constant for a given Vb, with the possible exception of the first one in each driving pulse P3. Further, as Vm equal zero during each period T2′, the duration of the latter is also constant.

It is also easy to see that during each driving pulse P3, the mean value of the voltage Vm is equal to Vr, which is of course also chosen equal to the voltage the motor M has to receive during each driving pulse to correctly function.

Figure 6:
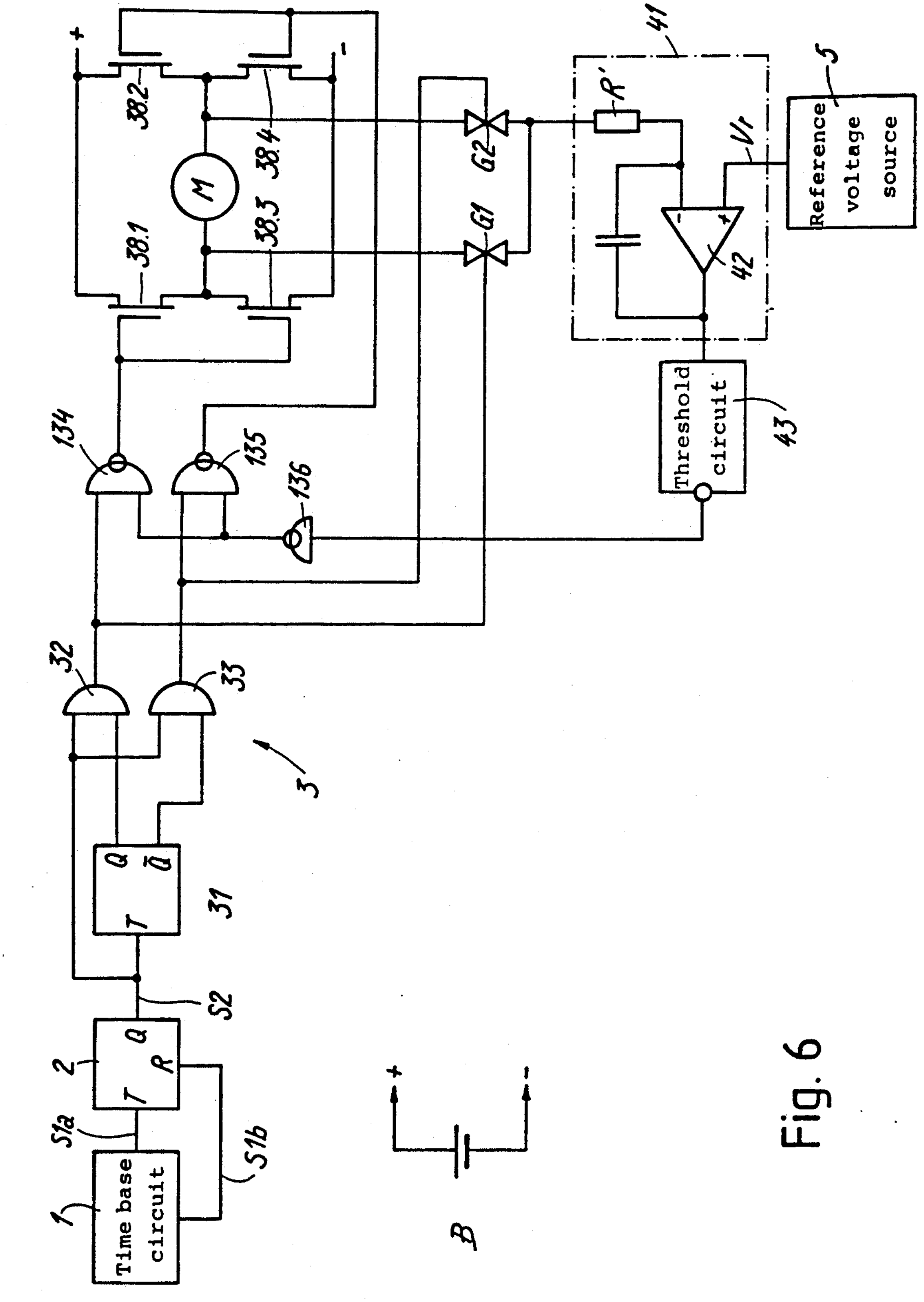
FIG. 6 represents a more detailed schema of the second embodiment of the device of FIG. 1.

FIG. 6 shows a more detailed example of the embodiment of the device of FIG. 1 which has just been described.

The elements of this FIG. 6 which are identical to the corresponding ones of FIG. 4 are referenced as they are in the latter FIG. 4 and will not be described again here.

Driving circuit 3 of FIG. 6 differs from the one of FIG. 4 in that the elements 34 to 37 of the latter have been replaced by two NAND-gates 134 and 135 and an inverter 136 connected as shown.

The control circuit 4 of FIG. 6 comprises an integrator circuit 41 the input of which is connected to the common terminals of gates G1 and G2. This integrator 41 comprises, in a well known manner a differential amplifier 42, a capacitor C′ and a resistor R′ connected as shown.

Control circuit 4 further comprises a threshold circuit 43, such as a Schmitt-trigger circuit, which is so designed that its output is either at logic level low or high when its input, which is connected to the output of integrator 41, is positive or negative respectively. This output of the threshold circuit 43 produces the signal S4.

It is easy to see that when signal S2 is at the logic level low, that is between the driving pulses P3, the coil of motor M is short-circuited by the transistors 38.3 and 38.4 which are conducting, as in the case of FIG. 4.

Further, the signal S41 which appears at the output of integrator 41 and which represents the above-defined function I is positive, so that signal S4 is at logic level low, that is in its first state.

Thus, at the very beginning of a pulse P2, which causes for example the flip-flop 31 to switch to the state where its Q output is at logic level high, the coil of motor M is immediately connected to the power supply source B, in this example by transistor 38.1 which switches on, transistor 38.3 switching off at the same time. Further, gate G1 becomes conducting.

The signal S41 begins thus to decrease, due to the voltage Vm, equal to Vb at that moment, which is now applied to the input of this integrator 41, causing the difference Vr−Vm to be negative.

When the signal S41 reaches the value zero, or a value slightly negative, signal S4 switches to its second state, that is logic level high. Responsive to that high level, transistor 38.1 switches off and transistor 38.3 switches on, so that the coil of motor M is again disconnected from the power supply source B and short-circuited.

Signal S41 begins thus to increase, for the voltage Vm is now substantially zero and the difference Vr−Vm is thus positive.

When this signal S41 reaches the value zero, or a value slighly positive, signal S4 switches to its first state, that is logic level low. Responsive to that low level, transistor 38.1 and 38.3 switch again on and off respectively, so that the coil of motor M is again connected to the power supply source B.

Voltage Vm is thus again equal to Vb, and the above described process repeats until the end of pulse P2, where transistors 38.1 and 38.3 switch off and on respectively. At the same time gate G1 switches off.

During the next pulse P2, the device of FIG. 6 reacts in a way very similar to the one which has just been described. The only difference, due to the logic level high which is now present at the output $\overline{Q}$ of flip-flop 31, is that it is now the transistors 38.2 and 38.4 which switch on and off respectively in response to the first state of signal S4 to connect the coil of motor M to the power supply source B, and which switch off and on respectively in response to the second state of signal S4 to disconnect this coil from this power supply source and to short-circuit it, and that it is now the gate G2 which is conducting.

The driving circuit 3 applies thus to the coil of motor M a driving pulse P3 having a polarity inverted with respect to the polarity of the precedent pulse P3, but the polarity of the voltage Vm applied to the input of integrator 41 remains the same as during this precedent pulse P3.

It is clear that, if necessary, means could be provided for short-circuiting the capacitor C' between the driving pulses P3, in order to ascertain that the state of the integrator circuit 41 is always the same at the beginning of each driving pulse P3. Such means have not been shown, for their design is well within the ability of anybody skilled in the art.

With respect to the device of FIG. 4, the device of FIG. 6 which has just been described presents the advantage that it needs a much more smaller capacitor. For example, when the motor M is a motor like the ones which are usually used in wristwatches, the capacitor C' of FIG. 6 has to have a capacity of only about 500 picofarads, when the capacitor C of FIG. 4 has to have a capacity of about 1 microfarad. It is well known that a capacitor of such a large capacity is much more difficult to manufacture in an integrated circuit than relatively small capacitors of about 500 pF.

It is clear that the above-described analogous integrator 41 could be advantageously replaced by a digital circuit performing the same determination of the function I. Such a digital circuit is well known and will not be described here, for its design is within the abilities of anybody skilled in the art.

From the above description, it can be seen that the device of the invention, in all its embodiments, allows to supply a stepping motor with driving pulses during which the mean value of the voltage applied to the coil of this motor is constant and independant of the voltage of the power supply source. Thus, the device can be used in different apparatuses supplied by power supply sources having different voltages without having to adapt the stepping motor to different voltages.

Further, if the power source which supplies a device according to the invention is a battery the voltage of which decreases as it discharges, the stepping motor driven by this device functions equally well when this battery is fully loaded or almost discharged.

Moreover, the relatively low voltage applied by a device according to the invention to the coil of a stepping motor during each driving pulse is obtained without any detrimental power dissipation, and without using bulky components such as external inductance coils.

It is evident that control devices according to the present invention may equally well comprise a circuit for measuring the mechanical load driven by the motor and for producing an interruption signal in dependency on this measured load. In such devices, the pulse shaping circuit referenced 2 in the above described Figures does of course not receive the signal **S1*b*, but is so designed that it respond to this interruption signal for interrupting the P2 pulses and, thus, the driving pulses P3**, the duration of which is of course no more constant.

I claim:

1. A control device for a stepping motor having a coil and a permanent magnet rotor magnetically coupled to said coil, comprising:

- a power supply source;
- a pulse shaping circuit providing a control pulse each time said rotor has to turn by one step;
- driving means responsive to said control pulse and to a control signal for connecting said coil to said power supply source when said control signal is in a first state and for disconnecting said coil from said power supply source and short-circuiting said coil when said control signal is in a second state;
- a reference voltage supply source; and,
- a control means connected to said reference source and comprising an integrator circuit for producing an integration signal representative of the integral with respect to time of the difference between said reference voltage and the voltage across said coil, and a threshold circuit producing said control signal in said first state in response to said integration signal being positive with respect to a threshold voltage and in said second state in response to said integration signal being negative with respect to said threshold voltage.

2. The control device of claim 1, wherein said integrator circuitry comprises a differential amplifier having a first, inverting input connected to said coil during said control pulse, a second, non-inverting input connected to said reference voltage source, and a capacitor connected between said inverting input and an output producing said integration signal.

* * * * *